Figure 1:
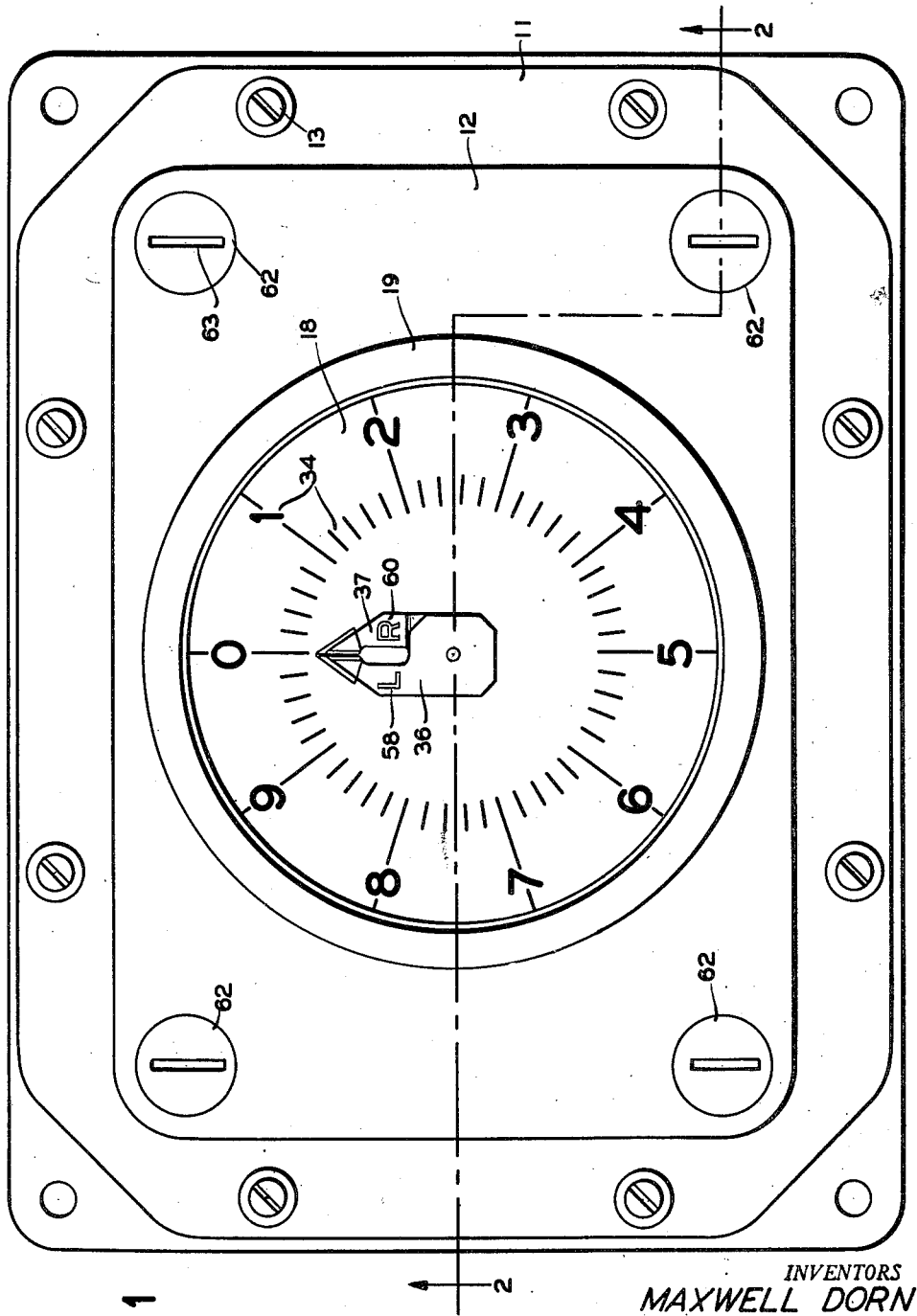

Feb. 26, 1957  M. DORN ET AL  2,782,752
ILLUMINATION OF INDICATING APPARATUS
Filed June 25, 1954  2 Sheets-Sheet 1

INVENTORS
MAXWELL DORN
WERNER ROSENBAUM
BY Tyler S Roundy
ATTORNEY

Feb. 26, 1957 M. DORN ET AL 2,782,752
ILLUMINATION OF INDICATING APPARATUS
Filed June 25, 1954 2 Sheets-Sheet 2
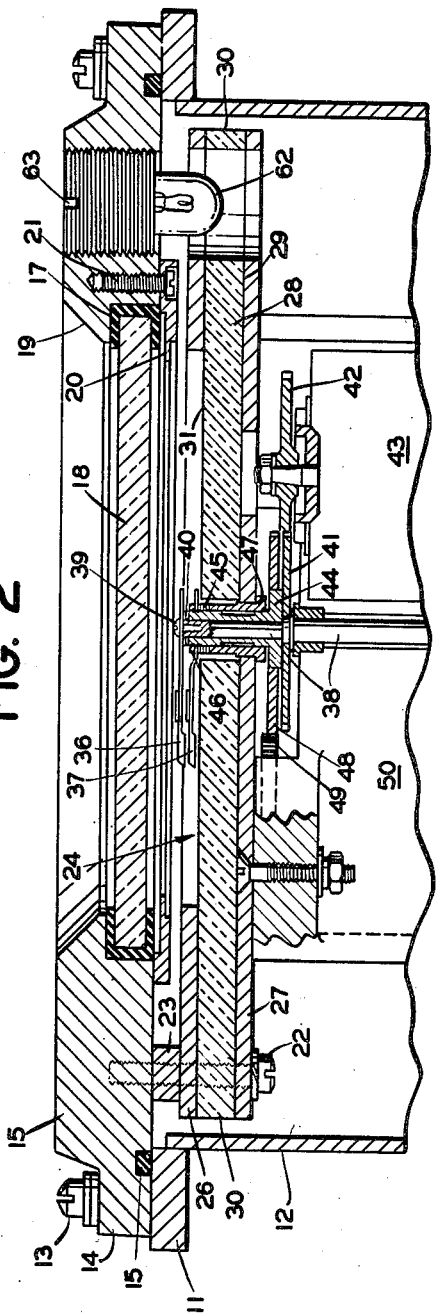
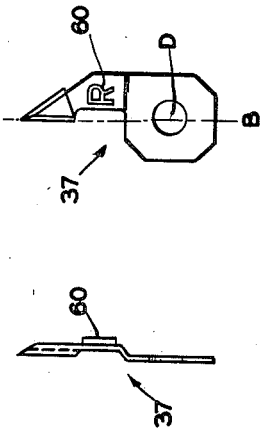
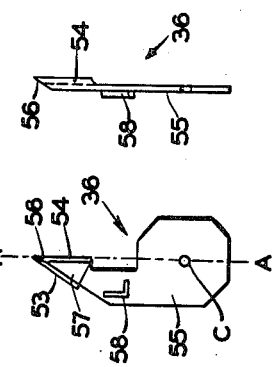
INVENTORS
*MAXWELL DORN*
*WERNER ROSENBAUM*

2,782,752

ILLUMINATION OF INDICATING APPARATUS

Maxwell Dorn, Jersey City, N. J., and Werner Rosenbaum, New York, N. Y., assignors to Bendix Aviation Corporation, Teterboro, N. J., a corporation of Delaware Application June 25, 1954, Serial No. 439,446

7 Claims. (Cl. 116—129)

The present invention relates to indicating apparatus and the illumination thereof, and particularly, though not exclusively, to multi-pointer arrangements.

Heretofore, movable indicator or pointer members have been usually illuminated by means located generally in front of such members. In some constructions the light source has been located at one side of a pointer member so that light rays are directed across the dial to strike the sides of the pointer member. In some instances indicia were painted on the pointer members. However, in these constructions it has been necessary to provide the pointer members, whether opaque or light-conducting, with considerable thickness in order to present sufficient light pick-up or light-reflecting surface area. Not only does parallax become a problem but also a relatively large light projection gap adjacent to the lamp is necessary in order to flood all of the space occupied by the pointer or pointers with sufficient light. The result has been that considerable stray light is able to escape and strike the face or outer surface of the dial to reflect into the eyes of the observer producing objectionable glare. The problem is particularly troublesome in constructions employing pointer members composed of a light-conducting material such as "Lucite" where light of considerable intensity must be picked up by the pointer member and transmitted to the tip-end portion so that the latter is intensely illuminated. Due to the large tolerances of the stock involved, large allowances for thickness must be made which requires an even larger projection gap and hence more glare. Some attempts have been made to reduce glare by the provision of special shield rings between the lamps and pointers. But in many applications for indicating instruments, such as use in darkened environments requiring so-called "night vision," glare must be substantially eliminated so as not to interfere with the operating efficiency of the observer.

It is an object of the present invention to provide improved indicating apparatus.

It is another object of the invention to provide an improved movable indicator or pointer member characterized by superior dimensional control and ease of manufacture for large quantities.

It is another object of the invention to provide a pointer arrangement wherein one or more selected portions of a pointer is capable of being intensely illuminated without producing objectionable glare.

It is another object of the invention to provide indicating apparatus utilizing a plurality of movable indicator or pointer members each provided with a different identifying symbol or reference character capable of intense side illumination and a wide angle of observation permitted with minimum parallax or angle of observation error due to depth of displacement of the dial and indicator members with resepect to each other.

It is still another object of the invention to provide indicating apparatus utilizing a plurality of movable indicator or pointer members of small overall height adapted for use with a narrow light projection gap or aperture located adjacent to the lamp or lamps whereby stray light and glare is substantially eliminated.

The above and other objects and features of the present invention will become apparent hereinafter from a consideration of the detailed description which follows taken together with the accompanying drawings wherein one embodiment of the invention is illustrated by way of example. In the drawings wherein like reference characters refer to like elements throughout the several views, Fig. 1 is a front view of an indicating device embodying the present invention showing a pair of pointer members at the same angular position and offset in opposite directions in accordance with the invention;

Fig. 2 is a cross-sectional view taken along the line 2—2 in Fig. 1 and showing the pair of pointer members each rotated 90° in a counter-clockwise direction from the position shown in Fig. 1;

Figs. 3 and 4 are front and side views, respectively, of the outer pointer member of Figs. 1 and 2; and Figs. 5 and 6 are front and side views, respectively, of the inner pointer member of Figs. 1 and 2.

In Figs. 1 and 2 there is illustrated a dual-pointer indicating instrument suitable for use both in daylight and also in a darkened environment requiring so-called "night vision" and hence requiring indirect dial illumination and pointer illumination which as accompanied by an absolute minimum of stray light and glare. A flange portion 11 of a housing 12 is secured by means such as screws 13 to flange portions 14 of a cover member 15. A sealing gasket 16 is sandwiched between the flange portions. An annular rubber gasket 17 is fitted within an annular recess in the cover member and surrounds the circumferential rim of a transparent cover glass or window 18. A beveled annular surface 19 in the cover member serves as a frame for window 18. A ring-like or annular outer shield member 20 may be provided and secured to the cover member by means such as screws 21.

Secured to the cover member by means such as screws 22 and spacers 23 is a dial and mechanism assembly indicated generally at 24. Sandwiched between a ring-like or annular inner shield-member 26 and an inner support plate 27 is a cylindrical dial 28 of light-transmitting material which may be a plastic such as methyl methacrylate, more commonly flnown as "Lucite" or "Plexiglas." The inner surface 29 and the circumferential edge surface 30 are highly polished and surface 30 is preferably covered with a layer of white paint with an overlying layer of opaque paint or printer's ink. The outer surface 31 of the dial may be covered by a layer of white paint which in turn is covered by a layer of opaque paint or printer's ink, the dial indicia 34 being cut or engraved out of the opaque layer. Alternatively, the indicia 34 may be cut or engraved directly in the outer surface 31 of the dial and the resulting recesses filled with white paint, the remaining flat surface area which surround the recesses being covered with a layer of opaque paint or printer's ink which may be applied by a roller. In either construction, when light rays are transmitted by internal reflection through the dial the indicia are seen as white light, or colored light if a color filter is placed in front of each lamp, the opaque laver providing a dark contrasting background.

Means for supporting and rotating the outer pointer member 36 and the inner pointer member 37 will now be described. Mounted for rotation within suitable bushings or bearings is a shaft 38. The outer end of shaft 38 is threaded to receive a screw 39 which passes through an aperture in the pointer 36 and through a selected number of thin washers or shims 40 so as to secure the outer pointer to shaft 38. Shaft 38 is arranged to be rotated by a gear 41 secured thereto which meshes with a gear 42 which in turn is angularly displaced by one section 43 of a dual driving mechanism unit. Section 43 may be an electrical inductive follow-up or synchro device controlled by signals from a remote electrical transmitter device.

Centered on shaft 38 is a hollow shaft 44 which is threaded at its outer end to receive a selected number of thin washers or shims 45 and to pass through an aperture in the inner pointer 37 which is secured to the outer end of shaft 44 by a nut 46. The hollow shaft 44 turns in a bushing 47 secured to the plate 27. The shaft 44 is adapted for rotation by means of a gear 48 secured thereto and meshing with a gear 49 which in turn is angularly displaced by a second section 50 of the dual driving unit. Section 50 may be a second electrical follow-up or synchro device controlled by the signals developed by a second remote electrical transmitter device.

The pointer members 36 and 37 may be manufactured from thin sheet metal stock and stamped and bent into the desired shape. As seen best in Figs. 3 and 4 in order to form an index the outer pointer 36 has at its tip end a pair of over-hanging surfaces 53 and 54 which are bent so as to slope inwardly away from the outer surface 55 and converge to form a vertex edge or line 56. The resulting triangularly shaped surface 57 remains flush with the plane of outer surface 55. The surfaces 53, 54 and 57 may be covered with a layer of dull white paint. A raised indicium in the form of a capital letter "L" is stamped out of sheet metal, is painted white on its exposed surfaces and then cemented or otherwise secured to the outer surface 55 at a portion adjacent to the tip end and laterally offset in a left-hand direction away from a line A—A between the tip end and the pivot point C. Alternatively, the raised letter may be integral with the body of pointer 36 and stamped so as to be pushed outwardly the desired amount.

The inner pointer member 37 may have a similarly constructed and painted tip-end index portion and an adjacent portion provided with a similar raised white-painted metal letter "R" indicated at 60. This adjacent portion however is laterally offset in a right-hand direction from the line B—B. It will be noted that pointer 37 has its tail-end portion offset inwardly so that with the proper number of shims 40 and 45 the outer surface of the raised letter 60 lies substantially in the same plane as the inner edges of the surfaces 53 and 54 of the outer pointer 36, as seen in Fig. 2. As shown in Figs. 4 and 6, the edges of the characters "L" and "R" have sufficient slope so as to reflect into the field of vision of the observer any impinging light which passes across the outer surface 31 of the dial in directions generally parallel to surface 31.

Four lamps 62 are arranged around the circumference of the dial and threaded through the front end of the cover member by means of a screw-driver inserted in a slot 63 provided in the socket end of each lamp. The lamps are energized by means (not shown) within the housing 12. Each lamp extends through a circular aperture provided in the inner shield ring 26 and part way into a circular aperture provided in the dial 28. The narrow clearance distance between the annular inner surface of outer shield ring 20 and the annular outer surface of inner shield ring 26 defines an annular light-projection gap or aperture, the magnitude of this clearance distance determining the amount of space in front of the dial that is permitted to receive light rays.

The center of the filament of each lamp is preferably located substantially midway between the planes of the two surfaces which define the projection gap. In this manner, some light rays from the lamp are directed into the edge 30 of the dial for transmission by internal reflection to illuminate the dial indicia and other light rays are directed through the projection gap for projection across the outer surface 31 of the dial in directions generally parallel thereto. The latter rays strike and are reflected from the sloping edges of the raised letter on each pointer and from the converging surfaces at the tip-end of each pointer. The portions of the pointers which are not painted white may be painted black if desired. By offsetting the letter-bearing portion of each pointer in opposite directions the letter 60 on the inner pointer 37 remains exposed to view when the tip ends of the two pointers are in the same angular position.

In one construction the following approximate dimensions were found to be especially satisfactory. The pointers were made from stock which was 0.025 inch thick, the raised letters had a height of 0.025 inch, the tip-end portions of the pointers being bent so as to have a height of 0.0312 inch. By selecting the proper number of shims, the separation distance between the top of the raised letter on pointer 37 and the bottom of pointer 36 was made 0.023 inch. The overall height of the two pointers was 0.156 inch and the light-projection gap was 0.025 inch.

Although one specific embodiment of the invention has been illustrated and described in detail by way of example, it is to be expressly understood that the invention is not limited thereto. Various changes may be made in the shape, size and design of the pointers and dial without departing from the spirit and scope of the appended claims as will now be understood by those skilled in the art.

What is claimed is:

1. In combination, a pair of indicator members adapted for rotation one in front of the other on coaxial shafts, the outer indicator member comprising an elongated body having a tip end and a portion adjacent said tip end provided with a first identifying symbol, said portion being laterally offset in one direction from a line extending between said tip end and the pivot for said outer indicator member, the inner indicator member comprising an elongated body having a tip end and a portion adjacent said last-mentioned tip end provided with a second identifying symbol, said last-mentioned portion being laterally offset in a direction opposite to said one direction from a line extending between said last-mentioned tip end and the pivot for said inner indicator member so that said second identifying symbol remains exposed to view when said members are in the same angular position where the tip end of the outer member is substantially directly in front of the tip end of the inner member.

2. In indicating apparatus, a dial, a pair of indicator members mounted for rotation one in front of the other adjacent the outer surface of said dial, means for rotating said members with respect to each other, each of said members having a different raised reference character extending outwardly from an outer surface of the member, and means for directing light rays across said dial so that said rays strike and reflect from the sides of said raised characters into the field of view of the observer.

3. In indicating apparatus, a dial having indicia on the outer surface thereof, a pair of elongated relatively thin pointer members mounted for rotation one in front of the other adjacent said outer dial surface, each of said members having a tip-end portion provided with a pair of converging light-reflecting surfaces which form an index for cooperation with said indicia, each of said members having a different raised identifying symbol projecting from an outer surface of a portion adjacent to said tip-end portion, the raised dimension of each symbol being approximately the same as the thickness of said last-mentioned portion, and light-projection means including lamp means and means defining a narrow projection gap through which pass the light rays from said lamp means for projection across said dial surface to strike and reflect from said converging surfaces and said raised symbols, the raised dimensions of said symbols and dimension across said gap each being approximately the same magnitude as the thickness of said portions provided with said symbols.

4. Indicating apparatus according to claim 3 wherein said pointer members are composed of relatively thin sheet metal material and said converging surfaces for each pointer member comprise two portions of an outer surface thereof which is bent in inward directions away from said last-mentioned surface to impart a slope to said converging surfaces, said converging surfaces having a layer of light-reflecting material thereon.

5. Indicating apparatus according to claim 3 wherein the inner edges of the converging surfaces of the outer pointer member lie substantially in the plane of the outer surface of the raised symbol provided on the inner pointer member.

6. Indicating apparatus according to claim 3 wherein said dial is substantially cylindrical and composed of light-transmitting material, said projection gap being defined by the clearance distance between an opaque inner ring-like member and an opaque outer ring-like member which are substantially concentric with said dial, said lamp means comprising a plurality of lamps positioned adjacent to different points along the circumference of said ring-like members to direct light rays into said clearance space for projection across said dial.

7. In indicating apparatus, a dial, a pair of indicator members mounted for rotation one in front of the other and adjacent the outer surface of said dial, means for rotating said members with respect to each other, each of said indicator members comprising an elongated body having a tip end, at least one of said indicator members having a raised reference character with said surfaces extending outwardly from an outer surface of said one member, and means for directing light rays across said dial so that said rays strike and reflect from the side surfaces of said raised reference character into the field of view of the observer.

References Cited in the file of this patent
UNITED STATES PATENTS

| | | |
|---|---|---|
| 356,761 | Haight | Feb. 1, 1887 |
| 2,287,554 | Hanson | June 23, 1942 |
| 2,428,792 | Evans | Oct. 14, 1947 |